Oct. 4, 1932.　　　J. B. VAN DEREN　　　1,881,152
AUTOMATIC WEIGHING MACHINE
Filed Nov. 26, 1928　　　4 Sheets-Sheet 1

*James B. Van Deren*
INVENTOR.

Patented Oct. 4, 1932

1,881,152

UNITED STATES PATENT OFFICE

JAMES B. VAN DEREN, OF KINGFISHER COUNTY, OKLAHOMA

AUTOMATIC WEIGHING MACHINE

Application filed November 26, 1928. Serial No. 321,869.

My invention relates to improvements in weighing machines employed in weighing any commodity that will flow, and is intended to secure greater accuracy and more rapid weighing. I attain these objects by the mechanism illustrated in the accompanying drawings which—

In construction of this machine a frame is erected, which may be of any desired form and material. From this frame is suspended a system of scale like levers connected to a scale beam with suitable poise. This mechanism is connected to a clam shell to control the flow of commodity.

In a detailed description similar numerals refer to similar parts throughout the several views and I call the scale arrangement the "choker scale" and the clam shell "the choker". From this scale arrangement is suspended another system of scale levers connected to beam and poise, constituting a complete weighing scale and which I call "the weighing scale". Below the choker is a receiving hopper to the bottom of which is attached an oscillating chute adapted to deflect into first one compartment and then the other, alternately, of a two compartment container which is suspended from the weighing scale.

Figure 1:
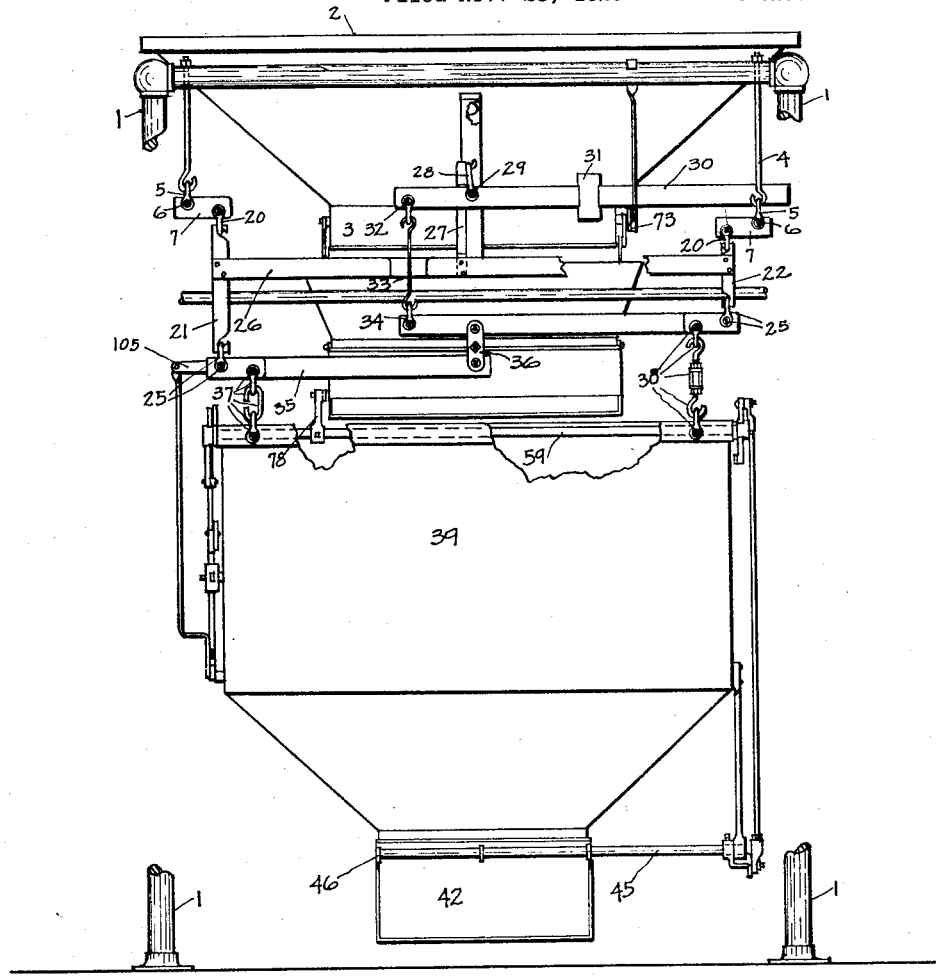
Figure 1 is an end elevation of the machine, with parts cut away to better show the working parts.
Figure 2:
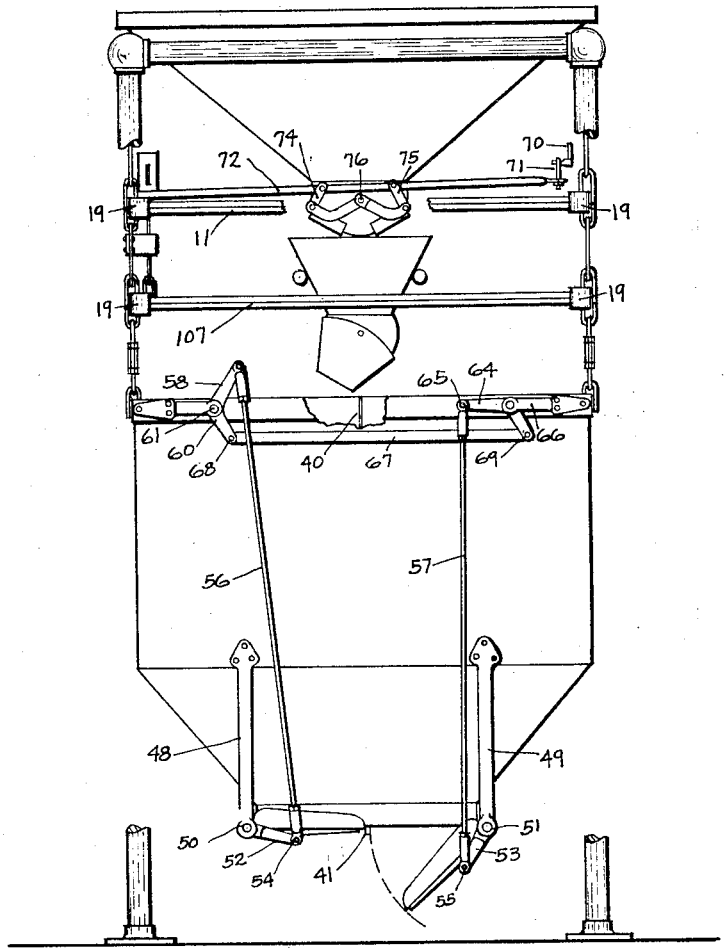
Figure 2 is a side view.
Figure 3:
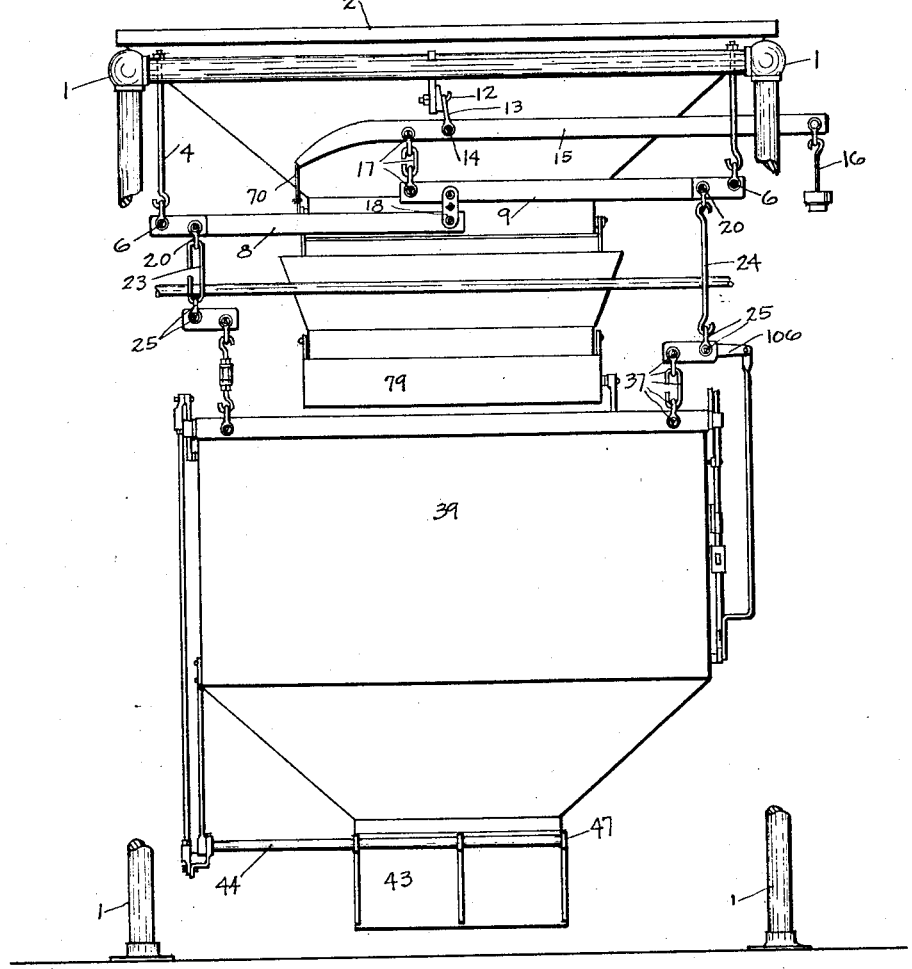
Figure 3 is also an end view.
Figure 4:
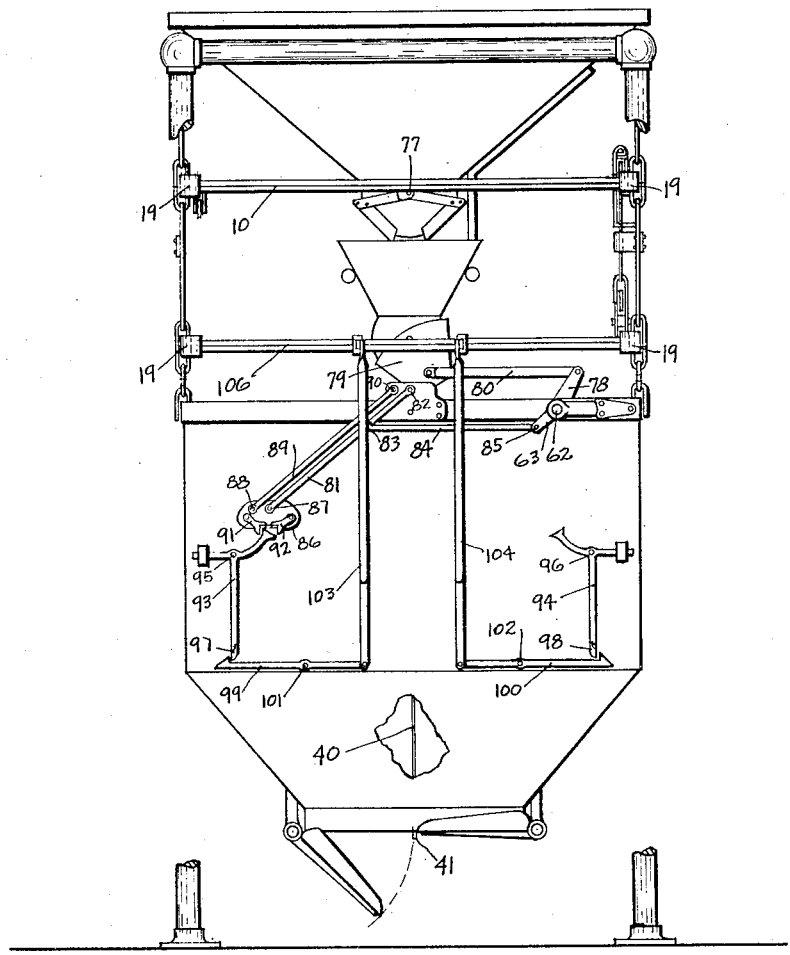
Figure 4 is a view of the opposite side.

A detailed description of the papers 1 is the main frame, 2 is the receiving hopper which feeds the commodity to the choker, 3 is a box like chamber formed by the lower part of the feed hopper and on which the choker works, 4 is eye bolts from which the choker scale is suspended, 5 is scale loops embracing knife edge pivots on which the tortion shaft of the choker scale pivots, 6 is the pivots referred to, 7 is short scale arm of choker scale, 8 and 9 are corresponding long arms on the opposite side and 10 and 11 are the tortion shafts connecting with the short arms, 12 is pivot from which the choker scale is suspended from the main frame, 13 is scale loop embracing pivot 14 suspending poise beam 15, 16 is poise and connection to said beam, 17 is pivot, loop and link connection between beam 15 and secondary beam 9, 18 is link and pivot connection between 8 and 9. It will be noted that these beams are pivoted at 6 the same as the short beams on the other side. The pivots 6, in both the choker and weighing scale, are placed in projecting castings on tortion shafts 10 and 11 in such position that the scale loops may embrace both ends of the pivots and at the same time the pivot is in the plane of the center of the tortion shaft. 19 shows the circle of these castings which are all similar. 20 is pivoted loop for suspending the weighing scale from the choker scale, 21 and 22 on one side and 23 and 24 on the other side suspend the weighing scale primary levers, at 25, 26 is bar fastened rigidly to links 21 and 22 and on this bar is mounted standard 27 which carries pivot and loop 28, which loop embraces pivot 29 which suspends weighing scale beam 30, on which is mounted sliding poise 31. This scale beam is connected by link and pivot 32 and link 33 and loop 34 to primary beams by links and pivots at 36. These primary beams are, in turn, connected to the container by pivots, 37, loops and turnbuckles 38. The container 39, has a central partition 40, and extending below the partition a division bar 41. The discharge openings of the container are controlled by doors 42 and 43, these doors are rigid with shafts 44, 45. Said shafts have one end pivoted to extention of container band at 46 and 47 and the other ends in brackets 48 and 49 at 50 and 51, to these shafts are rigidly connected, between brackets 48 and 49 and the walls of the container, arms 52, and 53, said arms are curved outwardly beyond the plane of body of the container and have pivots 54 and 55. Connected to these pivots are rods 56 and 57. The upper end of 56 is connected to bell crank 58 which is connected rigidly to shaft 59 at 60. This shaft has outboard bearing at 61, extends across the container and has another outboard bearing at 62 and has rigid arm 63 connected inside of said bearing. Link 57 is pivoted to bell crank 64 at 65. This bell crank is pivoted in bracket 66. Link 67 is pivotally connected to the other arm of these bell cranks at 68 and 69. 70 is extension from choker scale beam to which is attached pivoted hanger 71 which supports and controls long lever 72 which is pivoted to the frame at 73. To this long lever is attached the choker by means of links 74 and 75, which are pivoted to the long lever and to the arms of the choker as shown in Figure 2. The two blades of the clam shell choker are pivoted at 76 and 77. The extent of the opening between the choker blades may be regulated by any desired means that will prevent their complete closing or either or both blades may have a small portion of the closing edges removed as desired, this will appear obviously. To shaft 59 is rigidly attached arm 79 to which is pivoted link 80.

The latch mechanism comprises locking arm 81 which is pivoted at 82 and has pivoted to it, at 83, link 84, which link is pivoted to arm 63 at 85. The locking arm carries locking plate 86 pivoted at 87, to this plate is pivoted, at 88, to guide link 89 which is pivoted at 90. Pivoted to the locking plate are gravity pawls 91 and 92. 93 and 94 and are reducing levers pivoted at 95 and 96. The lower ends of these levers carry knee joints, pivoted extensions 97, 98, 99 and 100 are lever dogs which are pivoted at 101 and 102. To these dogs are pivoted links 103 and 104, which links are pivoted to arms 105 and 106, which are rigid with tortion shaft of weighing scale beam.

In operation, we will say that grain is to be weighed, the grain enters the receiving hopper and decends through the choker into the compartment of the container having its door closed until near the predetermined weight has accumulated, then the choker begins to close and continues to close until the desired dribble is reached and the dribble continues to fill the container until the weight for which the poise on the weighing beam is set. When the container decends further and unlocks the door and the weighed grain is discharged, the door of the other compartment is closed and locked and the choker opens to full flow. It will be noted that the open door has an advantage in leverage over the closed door, due to the arrangements of the connections between the two doors.

I claim:

In an automatic weighing machine, a receptacle, a choker adapted to control the flow of grain from said receptacle, a choker scale and connections between said choker and choker scale whereby as a predetermined weight is imposed upon said choker scale the choker is closed to the point of reducing the flow of grain to a dribble and when said choker scale is relieved of said weight the choker is immediately opened to full capacity, a weighing scale suspended from said choker scale, a two compartment container suspended from said weighing scale having a door for each compartment and means whereby as either door is opened the other door is closed, a valve for discharging grain alternately into said compartments as they are closed, means for operating said valve and means for locking and unlocking said doors alternately; the relation of all the elements and parts being such that grain is discharged from said receptacle through the choker and into the two compartment container under the control of said valve.

JAMES B. VAN DEREN.